US012801103B2

(12) United States Patent
Ezrielev et al.

(10) Patent No.: US 12,801,103 B2
(45) Date of Patent: Nov. 17, 2026

(54) MANAGING COMPLEX SYSTEM ASPECTS FOR A DATA PROCESSING SYSTEM

(71) Applicant: Dell Products L.P., Round Rock, TX (US)

(72) Inventors: Ofir Ezrielev, Be'er Sheva (IL); Jehuda Shemer, Kfar Saba (IL); Naomi Tova Michaels, Bet Shemesh (IL)

(73) Assignee: Dell Products L.P., Round Rock, TX (US)

( * ) Notice: Subject to any disclaimer, the term of this patent is extended or adjusted under 35 U.S.C. 154(b) by 420 days.

(21) Appl. No.: 18/517,252

(22) Filed: Nov. 22, 2023

(65) Prior Publication Data

US 2025/0164947 A1 May 22, 2025

(51) Int. Cl.
*G05B 15/02* (2006.01)
*G06F 9/451* (2018.01)

(52) U.S. Cl.
CPC .................................... *G05B 15/02* (2013.01)

(58) Field of Classification Search
CPC ................................ G05B 15/02; G06F 9/451
See application file for complete search history.

(56) References Cited

U.S. PATENT DOCUMENTS 10,430,517 B1 * 10/2019 Mulwad .............. G06F 11/0793
2007/0061385 A1 * 3/2007 Clark .................. G06F 11/1458
2024/0028955 A1 * 1/2024 Harutyunyan ........... G06N 5/04

* cited by examiner

*Primary Examiner* — John T Repsher, III
(74) *Attorney, Agent, or Firm* — WOMBLE BOND DICKINSON (US) LLP

(57) ABSTRACT

Methods and systems for managing operation of a data processing system are disclosed. To manage the operation of the data processing system, a user of the data processing system may interact with a graphical user interface to view system data for the data processing system. The system data may indicate a status of different aspects of the operation of the data processing system. Each aspect may be associated with an avatar on a first graphical representation and the user may select an avatar to view additional information regarding the avatar. Selecting an avatar may generate a second graphical representation including potential remedial actions that a user may select to modify the operation of the data processing system.

20 Claims, 8 Drawing Sheets

MANAGING COMPLEX SYSTEM ASPECTS FOR A DATA PROCESSING SYSTEM

FIELD

Embodiments disclosed herein relate generally to data processing system management. More particularly, embodiments disclosed herein relate to systems and methods to manage complex system aspects for a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
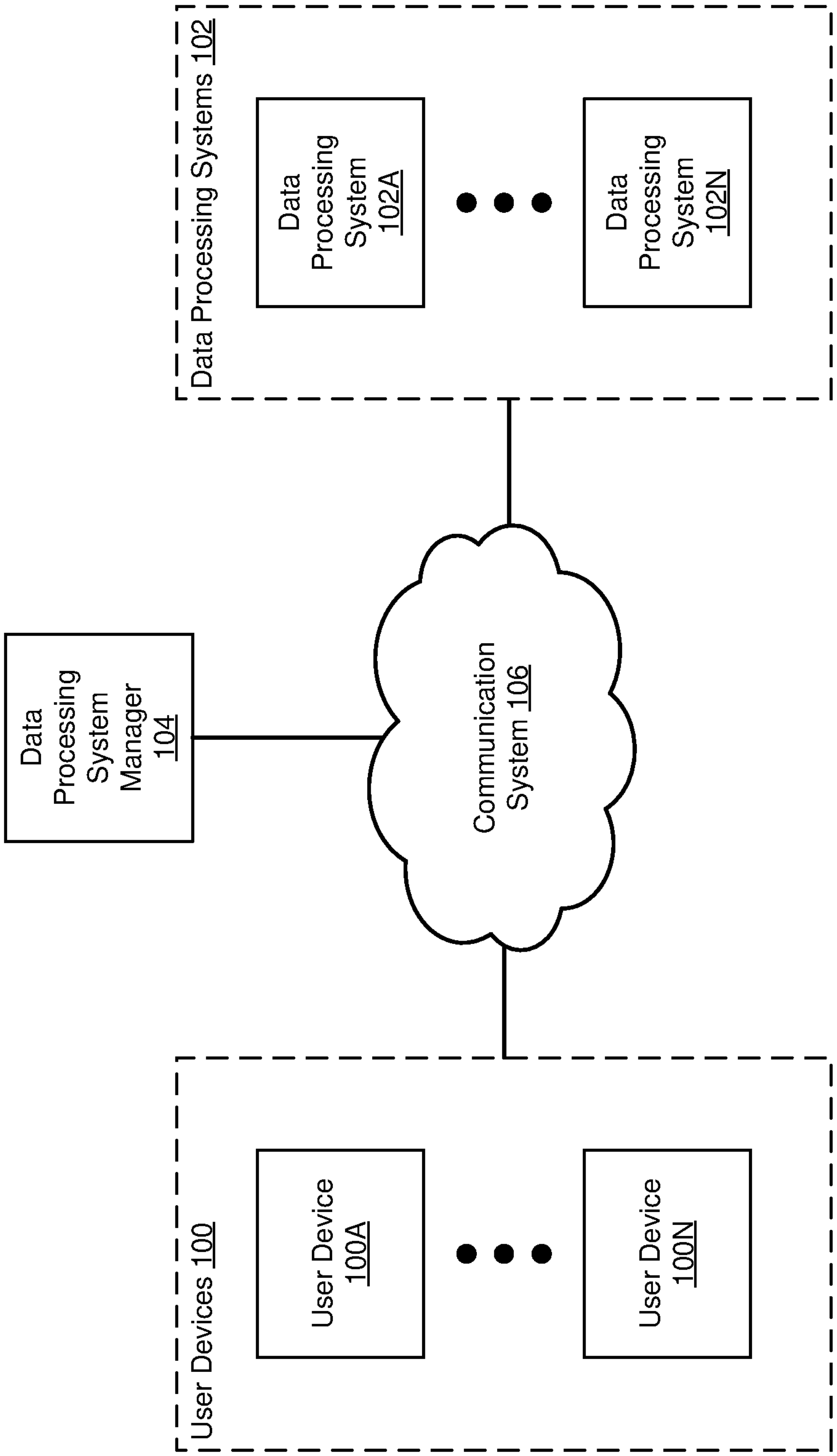
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services to any type and number of other devices and/or users of the data processing systems. The computer-implemented services may include any quantity and type of such services.

To provide the computer-implemented services, the data processing systems may need to operate in a predetermined manner conducive to, for example, execution of applications hosted by the data processing systems that provide the computer-implemented services. The applications may utilize certain configurations of hardware resources and/or software resources to provide the desired computer-implemented services.

The computer-implemented services may be desired by a user of a data processing system of the data processing systems. Changes to operation of the data processing system (e.g., due to non-nominal operation of the hardware resources and/or the software resources, due to modifications of security preferences by a user) may modify a type and/or availability of the computer-implemented services for the user. For example, the computer-implemented services may be interrupted, discontinued, and/or modified in an unexpected manner.

In response, the user may wish to initiate performance of one or more remedial actions. To do so, the user may interact with a data processing system manager via a graphical user interface (GUI). The GUI may present system data to the user and may provide potential remedial actions for the user to select. System data may include information related to overall system management and/or a status for the data processing system. For example, the system data may include: (i) system health data, (ii) security preferences for the user, (iii) data related to serviceability of the data processing system, (iv) configurations of hardware and/or software components of the data processing system, and/or (v) other data related to operation of the data processing system. However, the system data may be challenging for the user to interpret.

To present the system data to the user in a more easily digestible format, the system data may be divided into portions and each portion of the portions may represent a distinct aspect of the system data.

For example, a first aspect of the system data may indicate a recoverability of the data processing system and a first portion of the system data may be used to aggregate data related to the recoverability of the data processing system. Similarly, a second aspect of the system data may indicate a performance capability of the data processing system and a second portion of the system data may be used to aggregate data related to the performance capability of the data processing system.

The GUI may present any number of aspects of the system data to the user and each aspect of the any number of the aspects may be represented using a unique avatar. The user may interact with the GUI, via selecting an aspect of the any number of the aspects, to view additional details regarding the aspect. After selecting the aspect, the GUI may present the additional details regarding the aspect to the user along with potential remedial actions to manage the aspect. The potential remedial actions may be selectable by the user to initiate performance of one or more of the potential remedial actions.

The user (and/or another entity such as an administrator) may also be able to interact with the GUI to predict downstream impacts of the potential remedial actions. For example, the user may select a potential remedial action of the potential remedial actions intended to modify and/or improve the first aspect of the operation of the data processing system. An entity (e.g., the data processing system manager, another device) may simulate (e.g., using a digital twin of the data processing system, a calculation, a simulation) potential impacts of the remedial action on other aspects of the operation of the data processing system. Therefore, the user may view, via the GUI, potential implications of the selected potential remedial action on other aspects of the operation which may inform a decision regarding which remedial action to select.

By doing so, a cognitive burden on the user may be alleviated and time consumed during interpretation of system data by the user may be reduced. Consequently, users may more efficiently respond to undesired changes to the operation of the data processing systems, thereby increasing a likelihood of the computer-implemented services being provided as desired.

In an embodiment, a method of managing a data processing system is provided. The method may include: obtaining, via a graphical user interface (GUI), a request for a portion of system data for the data processing system from a user, the portion of the system data being associated with an aspect of multiple aspects of operation of the data processing system; providing, via an updated GUI, the portion of the system data to the user; receiving, via the updated GUI, user feedback from the user based on the portion of the system data; making a determination, based at least on the user feedback, regarding whether to update the operation of the data processing system; in an instance of the determination in which the operation of the data processing system is to be updated: modifying the operation of the data processing system, based at least in part on the user feedback, to obtain an updated data processing system; and providing computer-implemented services using the updated data processing system.

Providing the portion of the system data to the user may include: performing a lookup process using a system data lookup table and an indicator of the aspect from the request as a key for the system data lookup table to obtain the portion of the system data; updating, based on the portion of the system data, the GUI to obtain the updated GUI; and displaying, via the updated GUI, at least the portion of the system data to the user.

The GUI may include a first graphical representation comprising: a first avatar representing a first aspect of the multiple aspects of the operation of the data processing system; a second avatar representing a second aspect of the multiple aspects of the operation of the data processing system; a first indicator of a first status of the first aspect; and a second indicator of a second status of the second aspect.

The first aspect of the operation of the data processing system may be one selected from a list consisting of: cost of the operation of the data processing system; a recoverability of the data processing system; a performance capability of the data processing system; and a capacity of the data processing system.

Each of the multiple aspects may be uniquely associated with a corresponding portion of the system data.

The updated GUI may include: a second graphical representation comprising: the first avatar associated with the first aspect; the first indicator of the first status of the first aspect; and the portion of the system data.

The first indicator of the first status of the first category may be one selected from a list consisting of: a quantification; and a color-coded element.

Making the determination may include: simulating, using a digital twin of the data processing system, the operation of the data processing system based on the user feedback to obtain updated simulated operation of the data processing system; and performing a comparison process, using the updated simulated operation of the data processing system and operation criteria for the data processing system to determine whether to update the operation of the data processing system.

Performing the comparison process may include: obtaining a quantification of the first status of the first aspect; making a second determination regarding whether the quantification of the first status of the first aspect falls within an approved range for the quantification of the first status of the first aspect.

The approved range for the quantification of the first status of the first aspect may be indicated by an administrator for the data processing system.

The method may also include: presenting, via the updated GUI, a preference selection tool to allow the user to establish relative preferences between at least two of the aspects of the multiple aspects.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide for management of data processing systems throughout a distributed environment that may provide, at least in part, computer-implemented services.

The system may include any number of data processing systems 102 (e.g., computing devices) that may each include any number of hardware components (e.g., processors, memory modules, storage devices, communications devices). The hardware components may support execution of any number and types of applications (e.g., software components).

The computer-implemented services may include any type and quantity of computer-implemented services. The computer-implemented services may include, for example, database services, data processing services, electronic communication services, and/or any other services that may be provided using one or more computing devices. Other types of computer-implemented services may be provided by the system shown in FIG. 1 without departing from embodiments disclosed herein.

The computer-implemented services may be provided to the users and/or to other entities throughout a distributed environment. A quality and/or availability of the computer-implemented services may be impacted by the operation of data processing systems 102 and, therefore, operation of hardware resources and/or software resources of data processing systems 102. Consequently, changes to the operation of data processing systems 102 may adversely impact provision of the computer-implemented services (e.g., the computer-implemented services may not be provided as expected, the computer-implemented services may be interrupted).

For example, a user may be an owner of a data processing system (e.g., 102A). The user may receive the computer-implemented services through interactions with data processing system 102A. In the event that the computer-implemented services are not provided as expected, the user may wish to view system data for data processing system 102A. The system data may include information related to operation of data processing system 102A including any deviations from nominal operation.

The system data may include: (i) configurations of hardware and/or software components of data processing system 102A, (ii) system health data for data processing system 102A, (iii) serviceability of data processing system 102A, (iv) security preferences for data processing system 102A, and/or (v) other data.

Specifically, the configurations and/or the security preferences may be keyed to different users, different geographical locations, may be remotely managed by a manufacturer and/or other third party, etc. The system health data may include information related to cost, recoverability, performance capability capacity, etc.

However, the system data may include a large volume of information related to the operation of data processing system 102A. Interpreting the large volume of information may be time consuming for the user and/or may place an undesirable cognitive burden on the user.

In addition, aggregating the system data into a statistic (e.g., an overall percentage, a score) may be challenging for the user to interpret in order to make informed decisions regarding modification of the operation of data processing system 102A. Specifically, a recoverability of data processing system 102A may meet expectations while a performance capability of data processing system 102A may not meet expectations. These details may not be captured by an overall statistic and, therefore, may hinder the user's ability to select remedial actions to be performed.

In general, embodiments disclosed herein may provide methods, systems, and/or devices for facilitating management of data processing systems by users through interpretation of system data for the data processing systems. To present the system data to the user while reducing the cognitive burden and time resources needed to interpret the system data, the system data for the data processing system may be presented to the user (via a GUI) as a first graphical representation depicting multiple aspects of the operation of the data processing system.

Figure 4A:
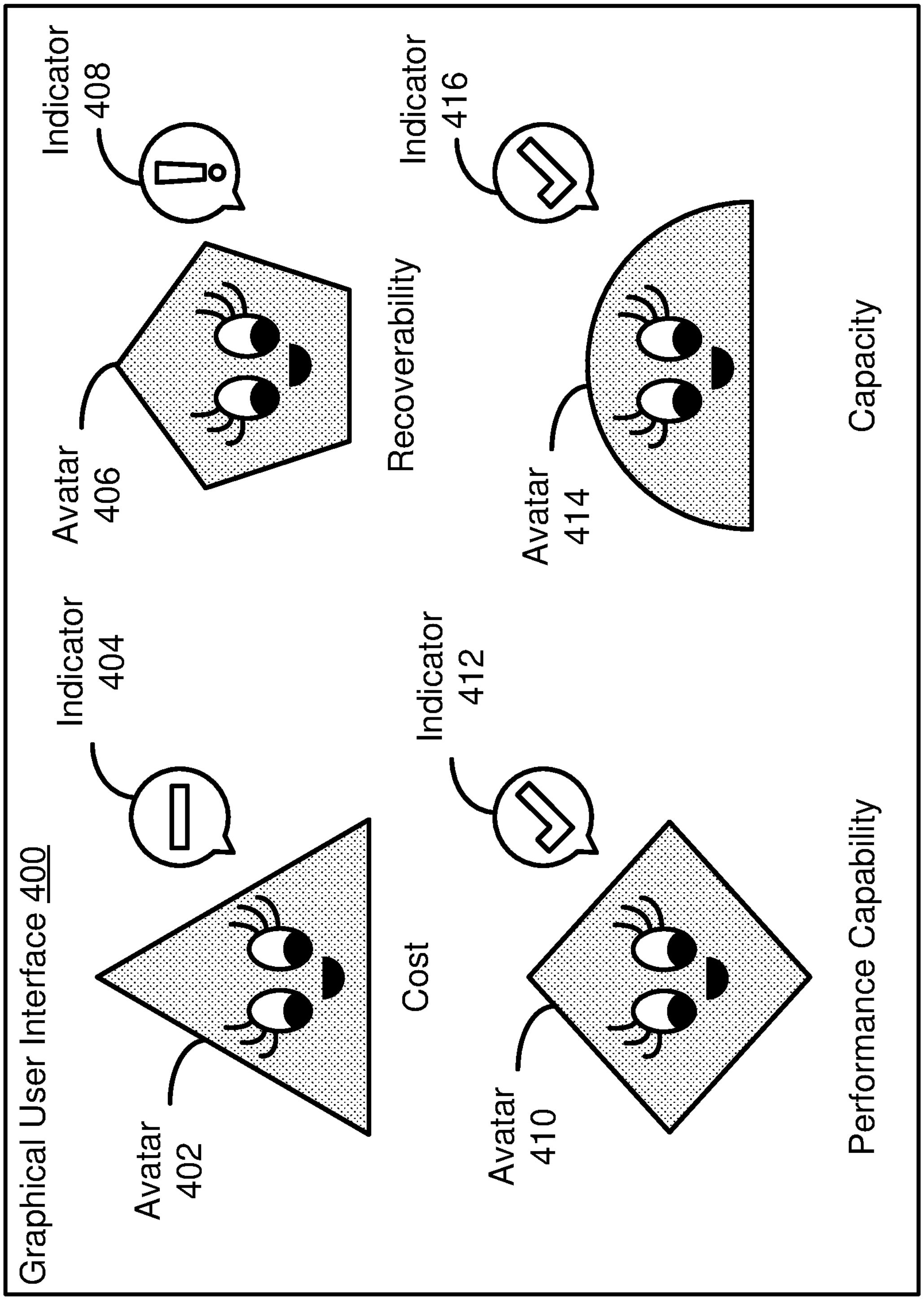
FIGS. 4A-4C show a graphical user interface (GUI) in accordance with an embodiment.

For example, the first graphical representation may include at least two avatars, each avatar of the at least two avatars representing a different aspect of the operation of the data processing system. Specifically, a first avatar of the at least two avatars may represent a first aspect and a second avatar of the at least two avatars may represent a second aspect. The first aspect may indicate, for example, a cost of the operation of the data processing system and the second aspect may indicate a recoverability of the data processing system. The first aspect and the second aspects may include other aspects without departing from embodiments disclosed herein. Refer to FIG. 4A for an example visual representation of the first graphical representation.

The first graphical representation may include other information including, for example, an indicator of a status of each aspect depicted in the first graphical representation. For example, a first indicator may include a quantification of a status of the first aspect (e.g., a calculated score), a color-coded indicator of the status of the first aspect, and/or any other type of indicator. The first indicator, therefore, may be usable to identify whether the first aspect meets expectations, does not meet expectations, exceeds expectations, etc.

Figure 4B:
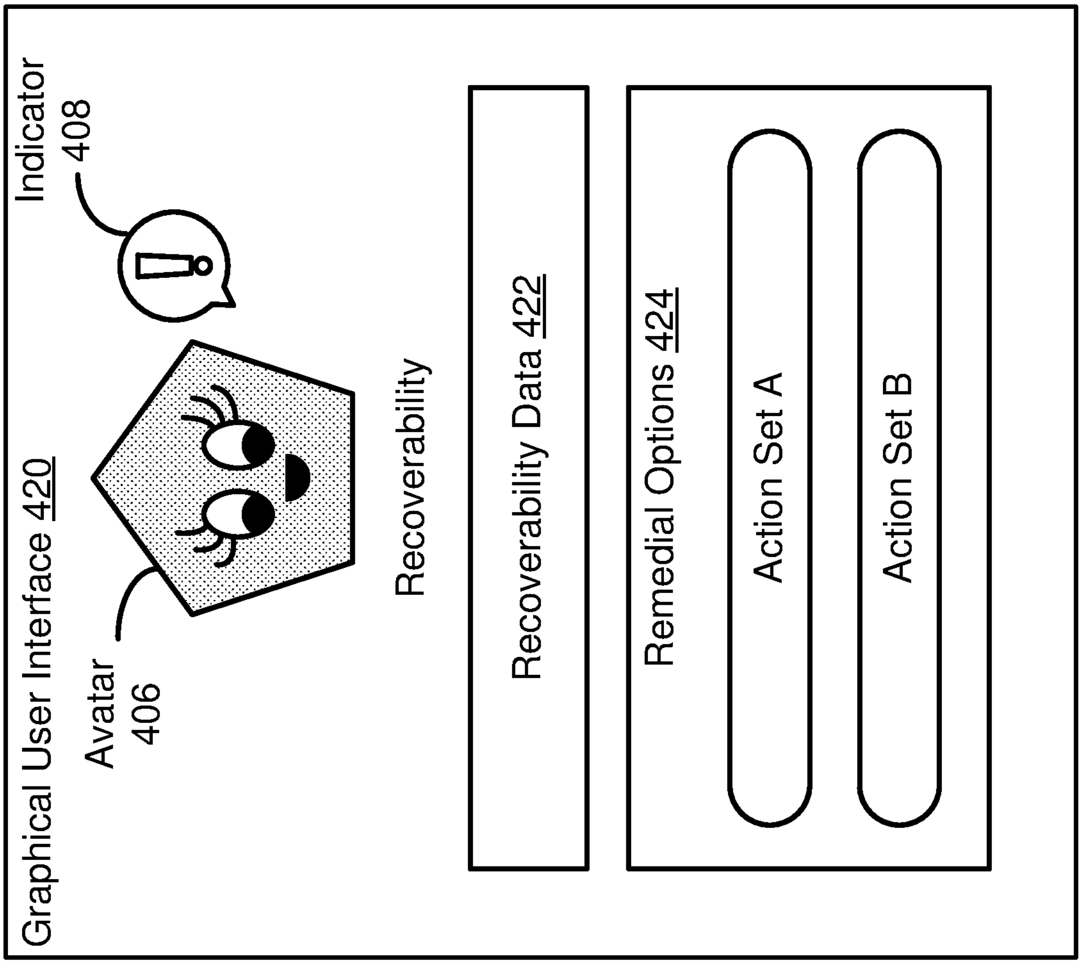

Via interactions with the GUI, the user may select the first aspect to view additional details related to the first aspect as presented in a second graphical representation. The second graphical representation may include a list of potential remedial actions selectable by the user. The user may interact with the second graphical representation to initiate one or more of the potential remedial actions to remediate (and/or otherwise modify) the first aspect of the system data. Refer to FIG. 4B for an example visual representation of the second graphical representation.

Figure 4C:
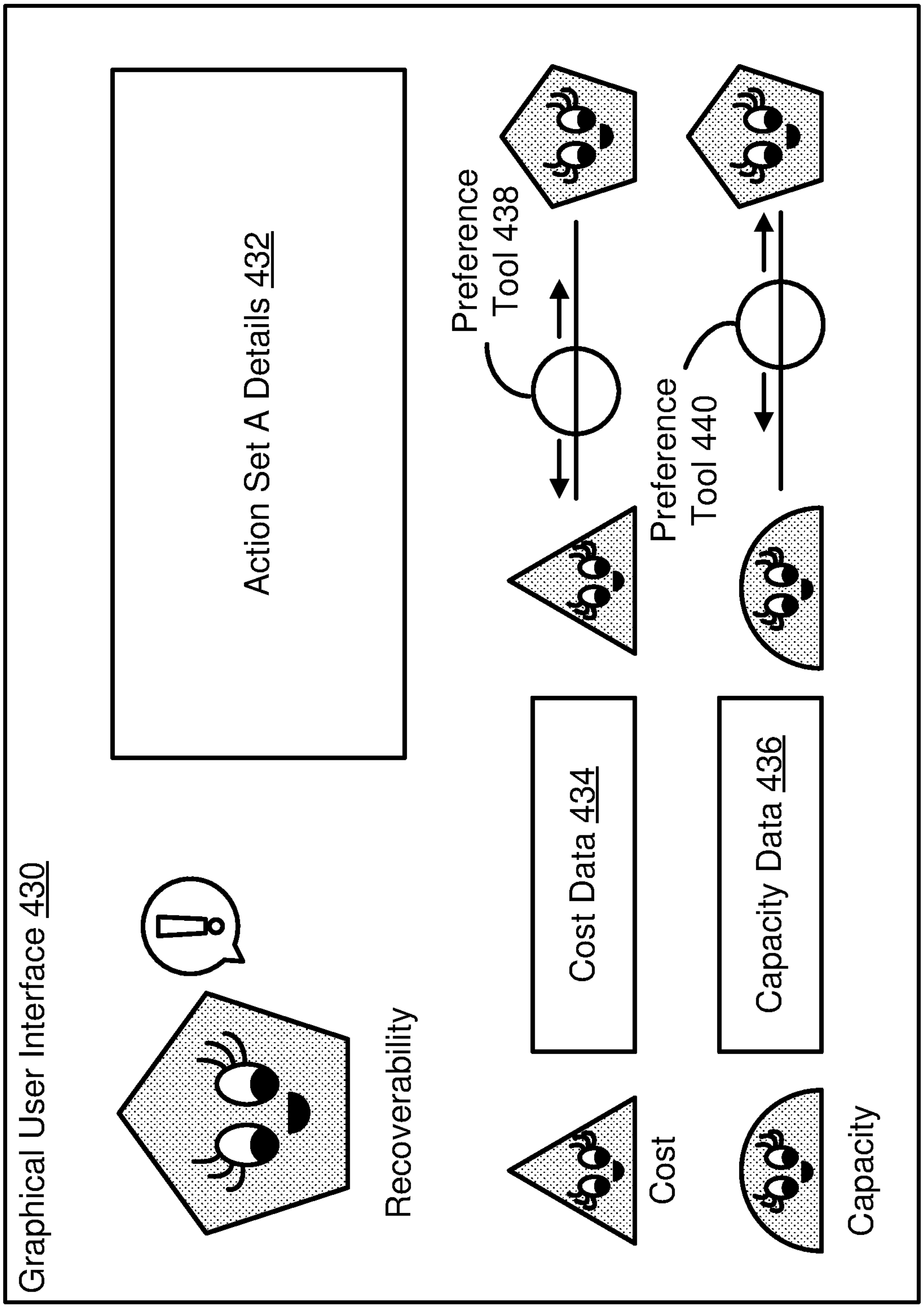

In addition, the user may also interact with the GUI to simulate potential downstream impacts of various remedial actions on other aspects of the operation of data processing system 102A. To do so, upon receiving feedback from the user (e.g., selection of a potential remedial action via the second graphical representation), a digital twin of the data processing system may be utilized to simulate impacts on each aspect of the system data upon implementation of the selected remedial action. The simulated impacts may be presented to the user via a third graphical representation of the GUI. Other methods of simulating the impacts may be utilized such as, for example, calculations, other simulations, inference models, etc. Refer to FIG. 4C for an example visual representation of the third graphical representation.

To perform the above-mentioned functionality, the system of FIG. 1 may include data processing systems 102, user devices 100, and/or data processing system manager 104. Data processing systems 102, user devices 100, data processing system manager 104, and/or any other type of devices not shown in FIG. 1 may perform all, or a portion of the computer-implemented services independently and/or cooperatively. Each of these components is discussed below.

Data processing systems 102 may include any number and/or type of data processing systems (e.g., 102A-102N). Any of data processing systems 102 may be operated by users and/or may provide computer-implemented services based on the users' operation. Data processing systems 102 may collect data related to the operation of data processing systems 102 and may provide the data to data processing system manager 104. Users may utilize a display (and/or other human interface devices associated with data processing systems 102) of data processing systems 102 to interact with the GUI and/or may utilize other devices throughout the distributed environment.

User devices 100 may include any number and/or type of data processing systems (e.g., 100A-100N). Any of user devices may be operated by users and/or may provide computer-implemented services based on the users' operation. User devices 100 may include any computing device usable by a user to interact with the GUI. Therefore, users may utilize data processing systems 102 and/or user devices 100 to interact with the GUI.

Data processing system manager 104 may be implemented using a physical device that stores and manages system data for data processing systems 102. For example, data processing system manager 104 may collect (e.g., continuously, on a recurring schedule) data related to the operation of data processing systems 102 from data processing systems 102. Data processing system manager 104 may store, analyze, aggregate, and/or otherwise manage the data to generate system data for data processing systems 102. The system data may be available to users of data processing systems 102 via the GUI.

To provide its functionality, data processing system manager 104 may: (i) obtain, via the GUI, a request for a portion of the system data for a data processing system (e.g., 102A) from a user, the portion of the system data being associated with an aspect of multiple aspects of operation of data processing system 102A, (ii) provide, via an updated GUI, the portion of the system data to the user, (iii) receive, via the updated GUI, user feedback from the user based on the portion of the system data, and/or (iv) determine, based at least on the user feedback, whether to update the operation of data processing system 102A. If the operation of the data processing system is to be updated, data processing system manager 104 may: (i) modify the operation of data processing system 102A, based at least in part on the user feedback, to obtain an updated data processing system, and/or (ii) provide computer-implemented services using the updated data processing system.

Figure 2A:
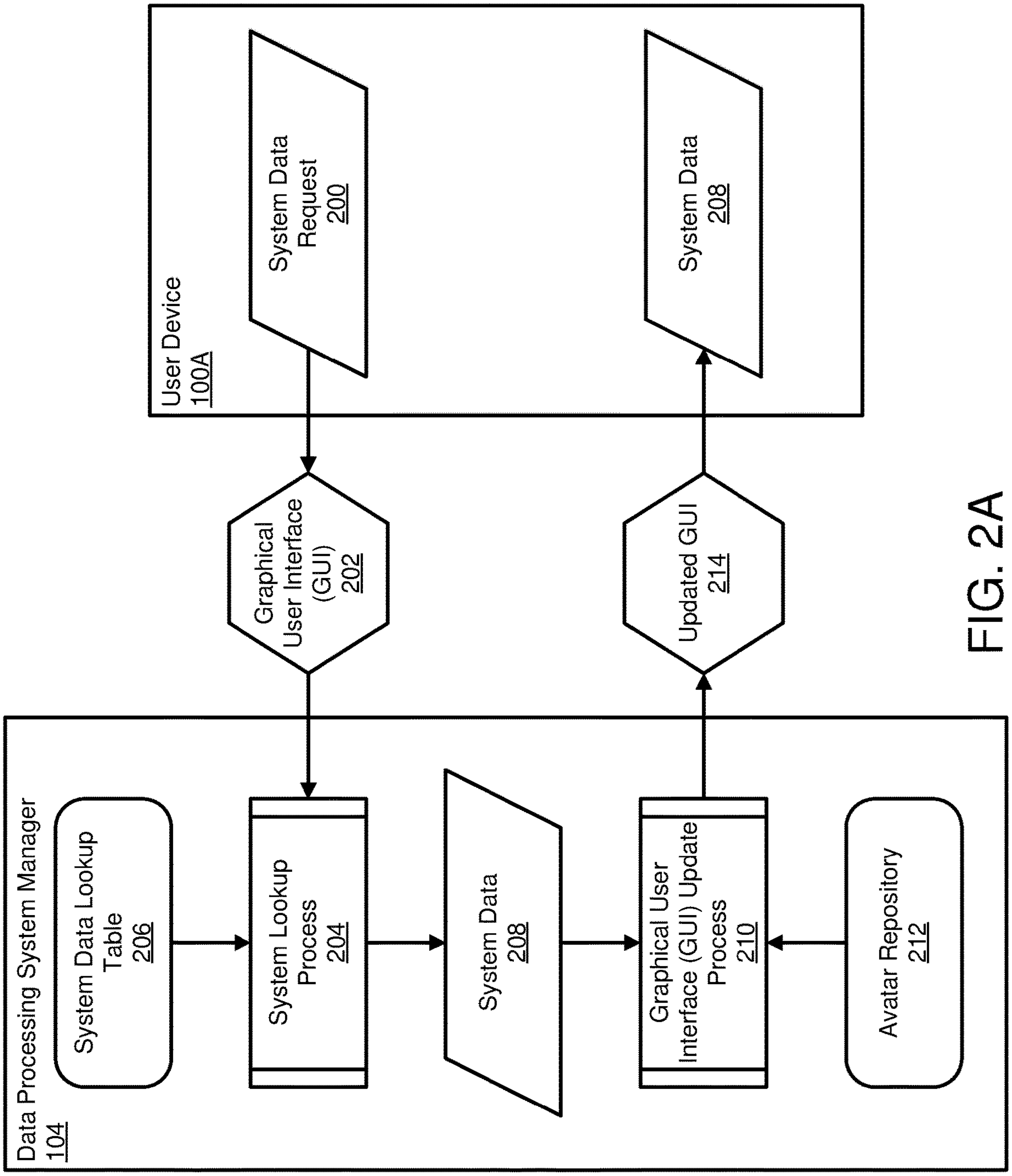
FIGS. 2A-2B show a block diagram illustrating data flows in accordance with an embodiment.
Figure 2B:
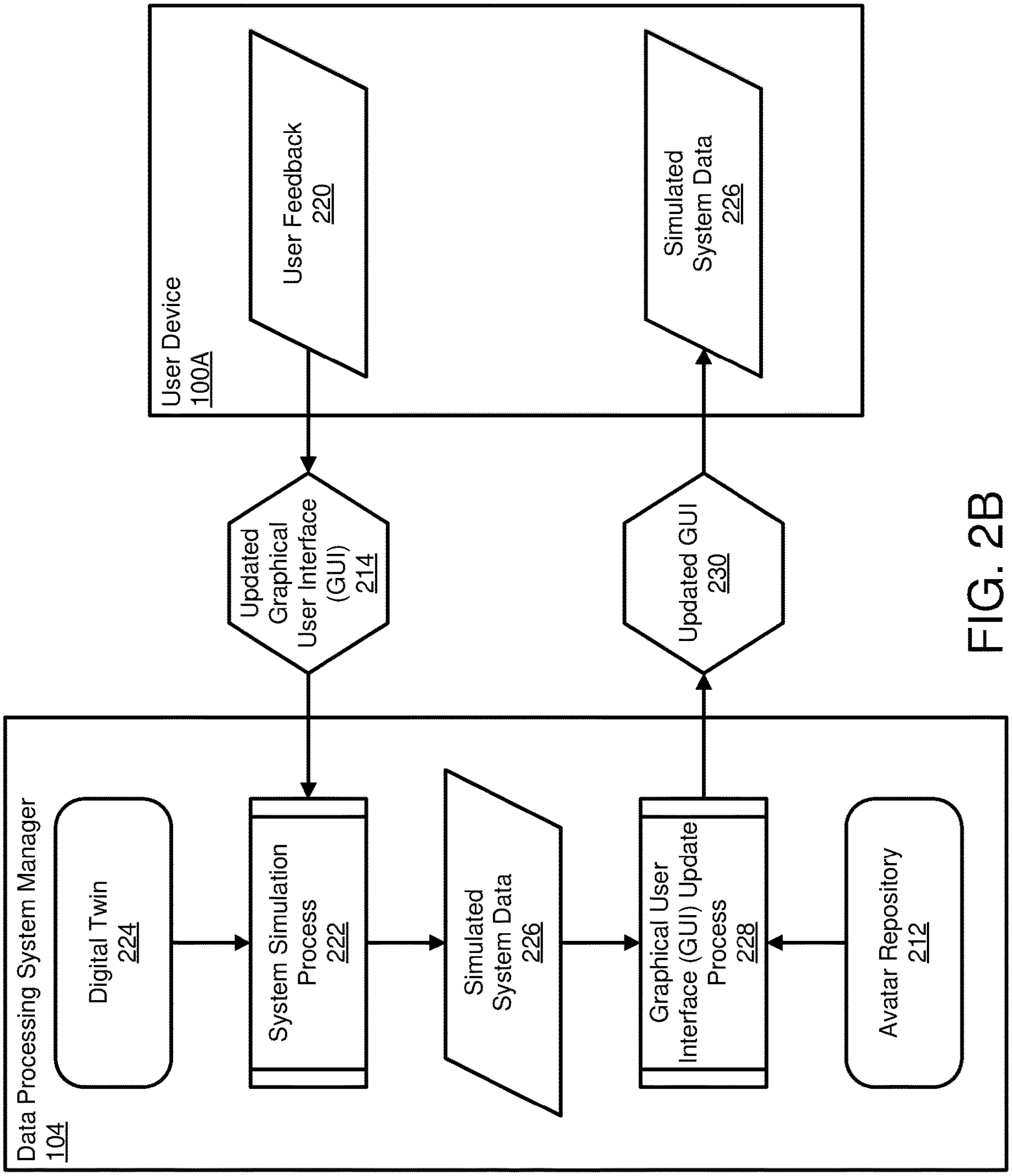
Figure 3:
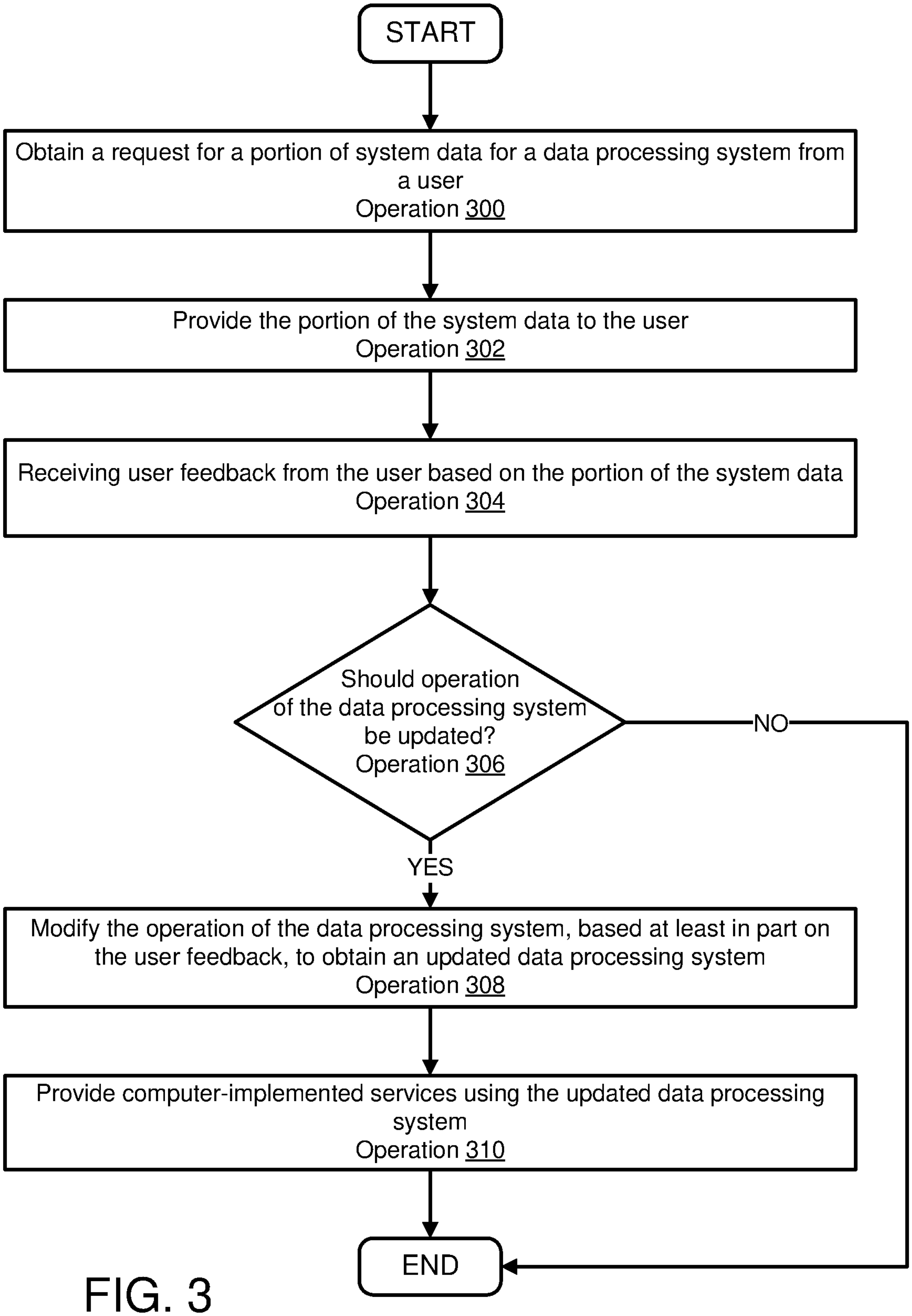
FIG. 3 shows a flow diagram illustrating a method of managing complex system aspects for a data processing system in accordance with an embodiment.

When performing its functionality, data processing systems 102, data processing system manager 104, and/or user devices 100 may perform all, or a portion, of the methods and/or actions shown in FIGS. 2A-3.

User devices 100, data processing system manager 104, and/or data processing systems 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of user devices 100, data processing system manager 104, and/or data processing systems 102 are implemented using an internet of things (IoT) device, which may include a computing device. The IoT device may operate in accordance with a communication model and/or management model known to user devices 100, data processing system manager 104, and/or data processing systems 102, other data processing systems, and/or other devices.

Any of the components illustrated in FIG. 1 may be operably connected to each other (and/or components not illustrated) with a communication system 106. In an embodiment, communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIGS. 2A-2B. These data flow diagrams illustrate examples of managing operation of a data processing system via interaction with a GUI.

In the data flow diagrams, processes performed by and interactions between components of a system in accordance with an embodiment are shown. In the data flow diagrams, components of the system are illustrated using a first set of shapes (e.g., data processing system manager 104, user device 100A. Processes performed by the components of the system are illustrated using a second set of shapes (e.g., system lookup process 204, GUI update process 210). Data structures are represented using a third set of shapes (e.g., system data 208, system data request 200) and data repositories are represented using a fourth set of shapes (e.g., system data lookup table 206, avatar repository 212). GUIs are represented using a fifth set of shapes (e.g., GUI 202).

Interactions (e.g., communication, data transmissions, etc.) between the components of the system are illustrated using a sixth set of shapes that extend between the other shapes. The sixth set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

FIG. 2A shows a block diagram illustrating a user device (e.g., 100A) interacting with a data processing system manager (e.g., 104) to obtain system data in accordance with an embodiment. The processes shown in FIG. 2A may be performed by any entity shown in the system of FIG. 1 (e.g., a user device similar to any of user devices 100, a data processing system similar to any of data processing systems 102, a data processing system manager similar to data processing system manager 104, etc.) and/or another entity without departing from embodiments disclosed herein.

A user of a data processing system (e.g., 102A described in FIG. 1) may wish to obtain at least a portion of system data for data processing system 102A. To do so, the user may provide system data request 200 to data processing system manager 104 using user device 100A via an interaction with GUI 202. System data request 200 may include a request for a portion of the system data for data processing system 102A. The portion of the system data may be associated with an aspect of multiple aspects of operation of data processing system 102A.

To do so, the user may access GUI 202. To access GUI 202, the user may provide access credentials (e.g., a password, a pin) to view a first graphical representation of the GUI on a display of user device 100A. The first graphical representation may include any number of avatars, each avatar of the any number of avatars being associated with an aspect of the multiple aspects.

Specifically, the first graphical representation may include: (i) a first avatar representing a first aspect of the multiple aspects of the operation of data processing system 102A, (ii) a first indicator of a first status of the first aspect, (iii) a second avatar representing a second aspect of the multiple aspects of the operation of data processing system 102A, (iv) a second indicator of a second status of the second aspect, and/or (v) any number of additional avatars with corresponding indicators. Refer to FIG. 4A for a visual representation of the first graphical representation.

The first avatar may include any image, symbol, character, or other representation corresponding to the first aspect. Similarly, the second avatar may include any image, symbol, character, or other representation corresponding to the second aspect.

The first aspect of the operation of data processing system 102A may include: (i) a cost of the operation of data processing system 102A, (ii) a recoverability of data processing system 102A, (iii) a performance capability of data processing system 102A, (iv) a capacity of data processing system 102A, (v) configurations of hardware and/or software components for data processing system 102A, (vi) serviceability of data processing system 102A, (vii) a security status of data processing system 102A, and/or (viii) other aspects. Similarly, the second aspect may include any of the aspects listed above with respect to the first aspect.

The cost of the operation of data processing system 102A may indicate a financial cost associated with operation of hardware components and/or software components of data processing system 102A. The recoverability of data processing system 102A may indicate a quantity of resources (e.g., time resources, computing resources) that may be consumed to recover from failures associated with the hardware and/or software components of data processing system 102A. The performance capability of data processing system 102A may indicate a computational capacity (e.g., a quantity of available computing resources such as certain amounts of memory, processor cycles, storage space) of data processing system 102A. The capacity of data processing system 102A may indicate a quantification of a computational workload data processing system 102A may be capable of performing.

The configurations of hardware and/or software components for data processing system 102A may include: (i) user preferences for security settings, (ii) user preferences for GUI components (e.g., font, size of icons, themes), (iii) settings for any software application (e.g., formatting preferences), and/or (iv) other configurations. The serviceability of data processing system 102A may indicate available resources (and/or a status of available resources) for technical support for data processing system 102A. For example, the serviceability may indicate recent and/or future software updates, schedules for hardware component replacement, a status of event logs and/or other monitoring for data processing system 102A. The security status of data processing system 102A may include logs of events, indicators of whether security software is outdated, and/or other indicators of a level of security for data processing system 102A.

Therefore, the user may provide system data request 200 to data processing system manager 104 by selecting (e.g., via GUI 202) the first avatar. Selecting the first avatar may trigger data processing system manager 104 to perform system lookup process 204. Performing system lookup process 204 may include: (i) identifying, from system data request 200, the first aspect, (ii) performing a lookup process using system data lookup table 206 and the first aspect as a key for system data lookup table 206 to obtain system data 208.

System data lookup table 206 may include a database of information obtained from data processing system 102A (and/or from other entities responsible for monitoring the operation of data processing system 102A) related to the operation of data processing system 102A. The information stored in system data lookup table 206 may be recent information due to a continuous update process. The continuous update process may include obtaining data related to the operation of data processing system 102A at regular intervals and replacing information included in system data lookup table 206 with more recently updated information.

The information related to the operation of data processing system 102A may include: (i) listings of configurations for hardware components and/or software components of data processing system 102A, (ii) event logs related to failure events and subsequent recovery events corresponding to the failure events, (iii) recent processes performed by data processing system 102A and corresponding computational resource consumption, and/or (iv) other information.

The system information included in system data lookup table may be organized so that information corresponding to the first aspect is labeled with an identifier for the first aspect. Therefore, during system lookup process 204, any information related to the operation of data processing system 102A related to the first aspect may be included in system data 208.

Specifically, system data 208 may include all information stored by system data lookup table 206 labeled as corresponding to the first aspect. Each of the multiple aspects may be uniquely associated with a corresponding portion of the system data. For example, system data 208 may include a first portion of the system data related to the first aspect (e.g., a recoverability of data processing system 102A).

Data processing system manager 104 may perform GUI update process 210 using system data 208 and avatar repository 212 to generate updated GUI 214. GUI update process 210 may include generating, based on the user's selection and system data 208, a second graphical representation. The second graphical representation may be deployed to update GUI 202 and obtain updated GUI 214.

Avatar repository 212 may include a database of avatars usable, at least in part, to generate updated GUI 214. Avatar repository 212 may include any number of avatars (e.g., symbols, characters). Avatars stored in avatar repository 212 may be labeled so that a first avatar is associated with the first aspect, etc. Therefore, a user may recognize the first avatar and may associate the first avatar with, for example, the first aspect (e.g., a potential recoverability issue for data processing system 102A).

GUI update process 210 may include identifying an avatar associated with the first aspect (e.g., the avatar selected by the user via interacting with GUI 202), the avatar being stored in avatar repository 212. The second graphical representation may include: (i) the first avatar associated with the first aspect, (ii) the first indicator of the first status of the first aspect, (iii) the portion of the system data, and/or (iv) other information. Refer to FIG. 4B for a visual representation of an example second graphical representation.

The first indicator may include, for example, a quantification, a color-coded element, and/or any other means of indicating the first status of the first aspect.

If the first indicator is represented as a quantification, the first avatar may be associated with a numerical score. A lower numerical score may indicate, for example, a less desirable status (e.g., non-nominal operation) and a higher numerical score may indicate a more desirable status (e.g., closer to nominal operation) of the first aspect.

If the first indicator is represented as a color-coded element, the first avatar may be associated with an image (e.g., a symbol, a shape) that displays a particular color and/or pattern. The color and/or pattern may be associated with a key indicating the degree to which the operation of the data processing system is expected, desirable, etc. For example, a red image may indicate undesirable operation and a green image may indicate desirable operation of the first aspect. User device 100A may obtain a copy of system data 208 via interacting with updated GUI 214.

Turning to FIG. 2B, a block diagram illustrating a user device (e.g., 100A) interacting with a data processing system manager (e.g., 104) to simulate modifications to operation of a data processing system is in accordance with an embodiment is shown. The processes shown in FIG. 2B may be performed by any entity shown in the system of FIG. 1 (e.g., a user device similar to any of user devices 100, a data processing system similar to any of data processing systems 102, a data processing system manager similar to data processing system manager 104, etc.) and/or another entity without departing from embodiments disclosed herein.

Consider a scenario in which the user obtains system data 208 as shown in FIG. 2A. System data 208 may indicate that the first aspect is not operating as expected (e.g., a recoverability of the data processing system is slower and/or consuming a larger quantity of resources than expected). Updated GUI 214 may display, to the user, a list of potential remedial actions that may improve the recoverability of data processing system 102A. The user may be able to select, via interacting with updated GUI 214, one or more of the remedial actions to be performed.

However, performing one or more of the remedial actions may adversely impact other aspects of the operation of the data processing system. Prior to initiating performance of the one or more actions, the user may wish to view the potential downstream impacts of the one or more actions on other aspects of the operation of the data processing system.

To do so, the user may provide user feedback 220, via updated GUI 214 and using user device 100A, to data processing system manager 104. User feedback 220 may include the one or more actions selected by the user. User feedback 220 may include no feedback and the user may view updated GUI 214 without interacting with updated GUI 214. If user feedback 220 includes a user selection, data processing system manager 104 may utilize user feedback 220 and digital twin 224 to perform system simulation process 222. Digital twin 224 may be include software substantially identical to software hosted by data processing system 102A and may simulate the operation of data processing system 102A. System simulation process 222 may include implementing the selected action using digital twin 224 to predict downstream impacts of the selected action to obtain simulated system data 226.

Simulated system data 226 may include data indicating a status of one or more of the aspects of the operation of the data processing system. For example, simulated system data 226 may include: (i) simulated recoverability data indicating an impact of performing the action on the recoverability of data processing system 102A, (ii) simulated performance capability data indicating an impact of performing the action on the performance capability of data processing system 102A, and/or (iii) other simulated data related to other aspects of the operation of data processing system 102A.

Data processing system manager 104 may perform GUI update process 228 using simulated system data 226 and avatar repository 212 to generate updated GUI 230. GUI update process 228 may include generating a third graphical representation, the third graphical representation including any number of avatars from avatar repository 212 and corresponding portions of simulated system data 226. Refer to FIG. 4C for an example visual representation of the third graphical representation.

User device 100A may obtain a copy of simulated system data 226 via interacting with updated GUI 230.

Data processing system manager 104, the user of user device 100A, and/or another entity may determine whether to update the operation of the data processing system based on simulated system data 226.

For example, simulated system data 226 may include quantifications (e.g., scores) associated with each aspect of the operation of the data processing system. Data processing system manager 104 (and/or any other entity) may compare the quantifications to approved ranges for the quantifications. The approved ranges may be indicated by any entity (e.g., an administrator for the data processing system, the user).

Specifically, simulated system data 226 may indicate that performing the one or more selected actions may modify the recoverability of data processing system 102A. The modified recoverability may be represented by a quantification (e.g., a score). The score may fall within the approved range and, therefore, the one or more selected actions may be approved for implementation. Similarly, if the score does not fall within the approved range, the one or more selected actions may not be approved for implementation.

In addition, simulated system data 226 may include quantifications of other aspects of the simulated operation of data processing system 102A (e.g., cost, performance). Approved ranges may be stored for these other aspects and if the one or more selected actions places one or more of the other aspects outside the approved ranges corresponding to the other aspects, the one or more selected actions may also not be approved for implementation.

In an embodiment, the one or more entities performing the operations shown in FIG. 2A-2B are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage operation of a data processing system. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data processing system in accordance with an embodiment is shown. The method may be performed, for example, by a data processing system, data processing system manager, user device, and/or any other entity.

At operation 300, a request for a portion of system data for a data processing system may be obtained from a user. Obtaining the request may include: (i) presenting the GUI to the user, (ii) receiving, via the GUI, the request from the user, and/or (iii) other methods.

The request may be obtained by (i) presenting a GUI similar to that illustrated in FIGS. 4A-4C, (ii) obtaining user input indicating the portion of the system data. While presented to the user, the user may select an avatar to indicate the request for the first portion of the system data, the first avatar being associated with a first aspect of operation of the data processing system.

At operation 302, the portion of the system data may be provided to the user. Providing the portion of the system data may include: (i) performing a lookup process using a system data lookup table and an indicator of the aspect from the request as a key for the system data lookup table to obtain the portion of the system data, (ii) updating, based on the portion of the system data, the GUI to obtain the updated GUI, (iii) displaying, via the updated GUI, at least the portion of the system data to the user.

Performing the lookup process may include: (i) obtaining the indicator of the aspect from the request, (ii) inputting the indicator into the system data lookup table, (iii) obtaining, from the system lookup table, any number of results, (iv) treating the any number of results as the portion of the system data, and/or (v) other methods.

Updating the GUI may include adding a second graphical representation to the GUI to obtain the updated GUI. Adding the second graphical representation may include generating the second graphical representation on the GUI. The second graphical representation may be similar to that shown in FIG. 4B.

Displaying at least the portion of the system data may include: (i) inputting the at least the portion of the system data to the second graphical representation, (ii) notifying the user that the at least the portion of the system data is available via the updated GUI, (iii) providing access to the updated GUI to the user, and/or (iv) other methods.

At operation 304, user feedback may be received from the user based on the portion of the system data. The user feedback may include one or more remedial actions. The user feedback may be received by monitoring user interaction with the updated GUI. For example, the user may select one or more remedial actions presented by the second graphical representation and a notification indicating which remedial actions were selected may be obtained.

At operation 306, it is determined whether operation of the data processing system should be updated. Determining whether the operation of the data processing system should be updated may include: (i) simulating, using a digital twin (and/or another model such as a set of calculations, an inference model) of the data processing system, the operation of the data processing system based on the user feedback to obtain simulated operation of the data processing system, (ii) performing a comparison process, using the updated simulated operation of the data processing system and operation criteria for the data processing system to determine whether to update the operation of the data processing system, and/or (iii) other methods.

Determining whether the operation of the data processing system should be updated may also include presenting, via the updated GUI, a preference selection tool to allow the user to establish relative preferences between at least two of the aspects of the multiple aspects. Presenting the preference tool may include generating the preference tool and deploying the preference tool to the updated GUI. Refer to FIG. 4C for additional details regarding the preference selection tool.

Simulating the operation of the data processing system may include: (i) identifying instructions for performing the one or more selected remedial actions indicated by the user feedback, (ii) providing the instructions to the digital twin for implementation, (iii) obtaining, from the digital twin, operational data generated following implementation of the instructions and subsequent operation of the digital twin, (iv) aggregating the operational data to generate the simulated operation of the data processing system, and/or (v) other methods.

Performing the comparison process may include: (i) obtaining a quantification of the first status of the first aspect, (ii) determining whether the quantification of the first status of the first aspect falls within an approved range for the quantification of the first status of the first aspect.

Obtaining the quantification may include: (i) reading the quantification from data included in the simulated operation of the data processing system, (ii) requesting the quantification from another entity, and/or (iii) other methods.

Determining whether the quantification falls within the approved range for the quantification may include: (i) obtaining the operation criteria, (ii) identifying the approved range using the operation criteria, (ii) comparing the quantification to the approved range, and/or (iii) other methods. Determining whether the quantification falls within the approved range may also include providing the operation criteria and the quantification to another entity responsible for determining whether the quantification falls within the approved range.

If at least a portion of the operational data does not meet the operation criteria, it may be determined that the operation of the data processing system should not be updated. If the operational data meets the operation criteria, it may be determined that the operation of the data processing system should be updated.

If the operation of the data processing system should be updated, the method may proceed to operation 308. If the operation of the data processing system should not be updated, the method may end following operation 306.

At operation 308, the operation of the data processing system may be modified, based at least in part on the user feedback, to obtain an updated data processing system. Modifying the operation of the data processing system may include directly and/or indirectly (e.g., by providing instructions to a management controller of the data processing system) modifying operation of hardware resources and/or software resources of the data processing system. Modifying the operation of the hardware resources and/or software resources may include: (i) updating configurations, (ii) rebooting portions of the hardware and/or software resources, (iii) deleting and/or re-organizing data stored by the data processing system, (iv) replacing software hosted by the hardware resources, and/or (v) other actions.

At operation 310, computer-implemented services may be provided using the updated data processing system. Providing the computer-implemented services may include: (i) identifying functionalities of the hardware resources and software components hosted by the hardware resources that are permitted following modification of the operation of the data processing system, (ii) utilizing the available hardware resources and/or software components (e.g., applications) to provide the computer-implemented services for the user of the data processing system, and/or (iii) other methods.

The method may end following operation 310.

Turning to FIGS. 4A-4C, diagrams of example GUIs are shown in accordance with an embodiment. The GUIs may facilitate user access to and interpretation of system data for a data processing system.

FIG. 4A shows graphical user interface 400, which may be similar to GUI 202 described in FIG. 2A. Graphical user interface 400 may display a first graphical representation similar to the first graphical representation described in FIG. 2A.

Graphical user interface 400 may include four avatars. Avatar 402 may be a first avatar of the four avatars. Avatar 402 may be represented as a character with a first shape (e.g., a triangle). Avatar 402 may have a label indicating that avatar 402 is associated with cost of a data processing system. Avatar 402 may also have an associated status indicator (e.g., indicator 404). Indicator 404 may be represented as a symbol. The symbol may include a horizontal bar and the horizontal bar may indicate, for example, that there is no alert associated with the cost of the data processing system. If there is no alert associated with an aspect (e.g., cost), the cost may be within expected boundaries.

Avatar 406 may be a second avatar of the four avatars. Avatar 406 may be represented as a character with a second shape (e.g., a pentagon). Avatar 406 may have a label indicating that avatar 406 is associated with recoverability of the data processing system. Avatar 406 may also have an associated status indicator (e.g., indicator 408). Indicator 408 may be represented as a symbol. The symbol may include an exclamation mark and the exclamation mark may indicate, for example, that there is an alert associated with the recoverability of the data processing system. If there is an alert associated with an aspect (e.g., recoverability), the recoverability may not be performing as expected.

Avatar 410 may be a third avatar of the four avatars. Avatar 410 may be represented as a character with a third shape (e.g., a diamond). Avatar 410 may have a label indicating that avatar 410 is associated with performance capability of the data processing system. Avatar 410 may also have an associated status indicator (e.g., indicator 412). Indicator 412 may be represented as a symbol. The symbol may include a check mark and the check mark may indicate, for example, that there is an alert associated with the recoverability of the data processing system. If there is an alert associated with an aspect (e.g., performance capability), the performance capability may be performing better than expected.

Avatar 414 may be a fourth avatar of the four avatars. Avatar 414 may be represented as a character with a fourth shape (e.g., a semi-circle). Avatar 414 may have a label indicating that avatar 414 is associated with capacity of the data processing system. Avatar 414 may also have an associated status indicator (e.g., indicator 416). Indicator 416 may be represented as a symbol. The symbol may include a check mark and the check mark may indicate, for example, that there is an alert associated with the capacity of the data processing system. If there is an alert associated with an aspect (e.g., capacity), the capacity may be performing better than expected.

Avatars may be represented as other characters, images, symbols, etc. without departing from embodiments disclosed herein. Similarly, status indicators may be represented in other ways (e.g., as scores, percentages, other symbols) without departing from embodiments disclosed herein.

A user interacting with graphical user interface 400 may be able to select one of the four avatars (e.g., avatar 406) to initiate generation of a second graphical representation as shown in FIG. 4B.

Turning to FIG. 4B, graphical user interface 420 is shown. Graphical user interface 420 may be similar to updated GUI 214 described in FIG. 2A. Graphical user interface 420 may display a second graphical representation similar to the second graphical representation described in FIG. 2A.

Graphical user interface 420 may be generated following a user selection of avatar 406 while interacting with graphical user interface 400. Graphical user interface 420 may include avatar 406, indicator 408, recoverability data 422 and remedial options 424. Therefore, the second graphical representation may show additional details related to the recoverability of the data processing system.

Recoverability data 422 may include any information related to a status of the recoverability of the data processing system. For example, aggregated statistics (e.g., scores, percentages) may be displayed by recoverability data 422. Recoverability data 422 may also include a text summary of the current status of the recoverability of the data processing system.

Remedial options 424 may include action set A and action set B. Action set A may include a first action that may improve the recoverability of the data processing system and action set B may include a second action that may improve the recoverability of the data processing system. Action set A and action set B may be selectable by a user. For example, a user may wish to implement action set A and may select action set A through an interaction with graphical user interface 420.

Following selection of action set A by the user, a digital twin of the data processing system may be utilized to simulate operation of the data processing system if the selected remedial action (e.g., action set A) is implemented.

Turning to FIG. 4C, graphical user interface 430 is shown. Graphical user interface 430 may include a display provided to the user following simulation of the operation of the data processing system using the digital twin. Graphical user interface 430 may include action set A details 432, cost data 434, capacity data 436, preference tool 438, and preference tool 440.

Action set A details 432 may include a list of modifications to be made to the operation of the data processing system as part of implementing action set A. For example, action set A details 432 may include any changes to hardware components, software applications, configurations, etc.

Below actions set A details 432, potential impacts of implementing action set A on the data processing system for other aspects (e.g., cost, capacity) are displayed. For example, the simulated operation of the data processing system using the digital twin may indicate that improving the recoverability increases cost and decreases capacity. Cost data 434 may include a listing of changes to the cost of operation of the data processing system as a result of implementing action set A. Similarly, capacity data 436 may include a listing of changes to the capacity of the data processing system as a result of implementing action set A.

The user (e.g., an administrator) may utilize graphical user interface 430 to indicate acceptable ranges for various aspects of the operation of the data processing system. For example, the administrator may indicate that changes to the cost of the data processing system are acceptable within certain limits. To make these selections, the administrator may interact with preference tool 438, preference tool 440, and/or other fields of graphical user interface 430 (not shown). Specifically, the administrator may enter an acceptable range corresponding to a score for capacity of the data processing system (not shown).

Preference tool 438 may include a sliding element (e.g., the circular shape) which may be moved to the right to preferentially select recoverability over cost and to the left to preferentially select cost over recoverability. Doing so may impact whether action set A is considered acceptable for implementation.

Similarly, preference tool 440 may include a sliding element (e.g., the circular shape) which may be moved to the right to preferentially select recoverability over capacity and to the left to preferentially select capacity over recoverability. Doing so may also impact whether action set A is considered acceptable for implementation.

The sliding elements of preference tool 438 and preference tool 440 may allow incremental (e.g., continuous and/or quantified) changes. Therefore, the administrator may have detailed control over limitations on the action sets to be performed.

Figure 5:
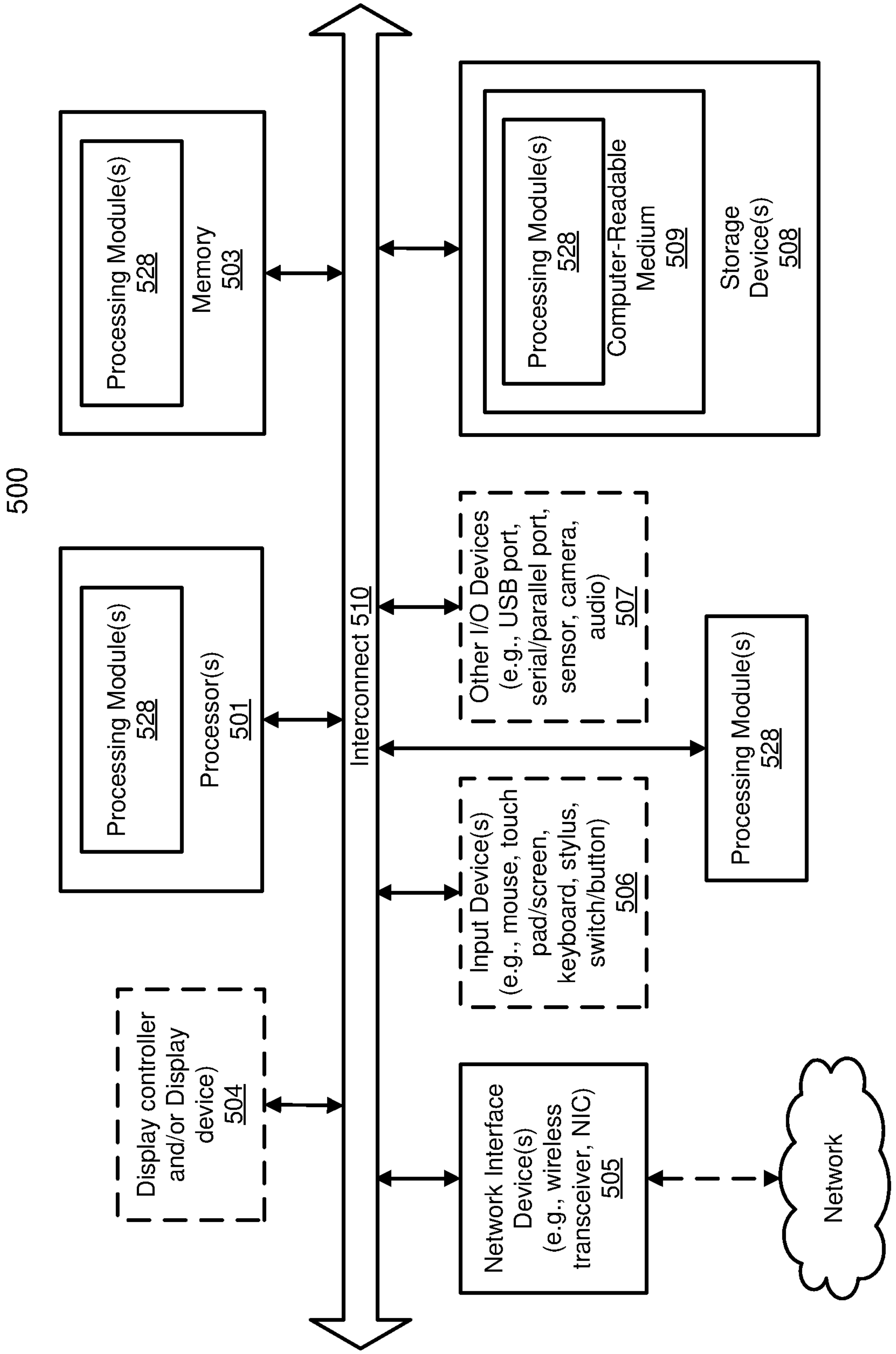
FIG. 5 shows a block diagram illustrating a data processing system in accordance with an embodiment.

Any of the components illustrated in FIGS. 1-2B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machineaccessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data processing system, the method comprising:

displaying, via a graphical user interface (GUI), a first graphical representation of multiple operational aspects of the data processing system,
  wherein the multiple operational aspects comprise:
    a first operational aspect; and
    a second operational aspect that is different from the first operational aspect, and
  wherein the first graphical representation comprises:
    a first avatar representing the first operational aspect;
    a first indicator of a first status of the first operational aspect;
    a second avatar representing the second operational aspect; and
    a second indicator of a second status of the second operational aspect;
obtaining, via the first graphical representation, a request to obtain a portion of system data,
  wherein the request is for the data processing system and the request is from a user, and
  wherein the portion of the system data is associated with the first operational aspect of the multiple operational aspects of the data processing system;
updating the GUI to display an updated GUI comprising a second graphical representation,
  wherein the second graphical representation comprises:
    a copy of the first avatar representing the first operational aspect;
    a copy of the first indicator of the first status of the first operational aspect; and
    the portion of the system data; and
    an action set associated with the first operational aspect, and
  wherein the second graphical representation does not display a copy of the second avatar representing the second operational aspect and does not display a copy of the second indicator of the second status;

receiving, via the second graphical representation, user feedback from the user, wherein the receiving is based on the portion of the system data;

making a first determination, based at least on the user feedback, regarding whether to update an operation of the data processing system, wherein making the first determination comprises:

simulating, using a digital twin of the data processing system, the operation of the data processing system, wherein the simulating is based on the user feedback, and wherein an updated simulated operation of the data processing system is obtained; and updating the second graphical representation to further display impact data for two operational aspects that are different than the first operational aspect, wherein the impact data is based on the updated simulated operation; and in an instance of the first determination in which the operation of the data processing system is to be updated:

modifying the operation of the data processing system, based at least in part on the user feedback, to obtain an updated data processing system; and providing computer-implemented services using the updated data processing system.

2. The method of claim 1, wherein providing the portion of the system data to the user comprises performing a lookup process to obtain the portion of the system data.

3. The method of claim 1, wherein the first operational aspect is one selected from a list consisting of:

a cost of the operation of the data processing system;

a recoverability of the data processing system;

a performance capability of the data processing system; and a capacity of the data processing system.

4. The method of claim 1, wherein each of the multiple operational aspects is uniquely associated with a corresponding portion of the system data.

5. The method of claim 1, wherein the first indicator of the first status of the first operational aspect is one selected from a list consisting of:

a quantification; and a color-coded element.

6. The method of claim 1, wherein making the first determination further comprises performing a comparison process, the comparison process uses the updated simulated operation of the data processing system and operation criteria for the data processing system to determine whether to update the operation of the data processing system.

7. The method of claim 6, wherein performing the comparison process comprises:

obtaining a quantification of the first status of the first operational aspect; and making a second determination regarding whether the quantification of the first status of the first operational aspect falls within an approved range for the quantification of the first status of the first operational aspect.

8. The method of claim 7, wherein the approved range for the quantification of the first status of the first operational aspect is indicated by an administrator for the data processing system.

9. The method of claim 6, further comprising:

presenting, via the updated GUI, a preference selection tool, wherein the preference selection tool allows the user to establish relative preferences between each of the two operational aspects that are different than the first operational aspect.

10. A non-transitory machine-readable medium having instructions stored therein, which when executed by a processor, cause the processor to perform operations for managing a data processing system, the operations comprising:

displaying, via a graphical user interface (GUI), a first graphical representation of multiple operational aspects of the data processing system, wherein the multiple operational aspects comprise:

a first operational aspect; and a second operational aspect that is different from the first operational aspect, and wherein the first graphical representation comprises:

a first avatar representing the first operational aspect;

a first indicator of a first status of the first operational aspect;

a second avatar representing the second operational aspect; and a second indicator of a second status of the second operational aspect;

obtaining, via the first graphical representation, a request to obtain a portion of system data, wherein the request is for the data processing system and the request is from a user, and wherein the portion of the system data is associated with the first operational aspect of the multiple operational aspects of the data processing system;

updating the GUI to display an updated GUI comprising a second graphical representation, wherein the second graphical representation comprises:

a copy of the first avatar representing the first operational aspect;

a copy of the first indicator of the first status of the first operational aspect; and the portion of the system data; and an action set associated with the first operational aspect, and wherein the second graphical representation does not display a copy of the second avatar representing the second operational aspect and does not display a copy of the second indicator of the second status;

receiving, via the second graphical representation, user feedback from the user, wherein the receiving is based on the portion of the system data;

making a first determination, based at least on the user feedback, regarding whether to update an operation of the data processing system, wherein making the first determination comprises:

simulating, using a digital twin of the data processing system, the operation of the data processing system, wherein the simulating is based on the user feedback, and wherein an updated simulated operation of the data processing system is obtained; and updating the second graphical representation to further display impact data for two operational aspects that are different than the first operational aspect wherein the impact data is based on the updated simulated operation; and in an instance of the first determination in which the operation of the data processing system is to be updated:

modifying the operation of the data processing system, based at least in part on the user feedback, to obtain an updated data processing system; and providing computer-implemented services using the updated data processing system.

11. The non-transitory machine-readable medium of claim 10, wherein providing the portion of the system data to the user comprises performing a lookup process to obtain the portion of the system data.

12. The non-transitory machine-readable medium of claim 10, wherein the first operational aspect is one selected from a list consisting of:

a cost of the operation of the data processing system;
a recoverability of the data processing system;
a performance capability of the data processing system; and
a capacity of the data processing system.

13. The non-transitory machine-readable medium of claim 10, wherein each of the multiple operational aspects is uniquely associated with a corresponding portion of the system data.

14. A data processing system, comprising:

a processor; and a memory coupled to the processor to store instructions, which when executed by the processor, cause the processor to perform operations for managing the data processing system, the operations comprising:

displaying, via a graphical user interface (GUI), a first graphical representation of multiple operational aspects of the data processing system, wherein the multiple operational aspects comprise:

a first operational aspect; and a second operational aspect that is different from the first operational aspect, and wherein the first graphical representation comprises:

a first avatar representing the first operational aspect;

a first indicator of a first status of the first operational aspect;

a second avatar representing the second operational aspect; and a second indicator of a second status of the second operational aspect;

obtaining, via the first graphical representation, a request to obtain a portion of system data, wherein the request is for the data processing system and the request is from a user, and wherein the portion of the system data is associated with the first operational aspect of the multiple operational aspects of the data processing system;

updating the GUI to display an updated GUI comprising a second graphical representation, wherein the second graphical representation comprises:

a copy of the first avatar representing the first operational aspect;

a copy of the first indicator of the first status of the first operational aspect; and the portion of the system data; and an action set associated with the first operational aspect, and wherein the second graphical representation does not display a copy of the second avatar representing the second operational aspect and does not display a copy of the second indicator of the second status;

receiving, via the second graphical representation, user feedback from the user, wherein the receiving is based on the portion of the system data;

making a first determination, based at least on the user feedback, regarding whether to update an operation of the data processing system, wherein making the first determination comprises:

simulating, using a digital twin of the data processing system, the operation of the data processing system, wherein the simulating is based on the user feedback, and wherein an updated simulated operation of the data processing system is obtained; and updating the second graphical representation to further display impact data for two operational aspects that are different than the first operational aspect, wherein the impact data is based on the updated simulated operation; and in an instance of the first determination in which the operation of the data processing system is to be updated:

modifying the operation of the data processing system, based at least in part on the user feedback, to obtain an updated data processing system; and providing computer-implemented services using the updated data processing system.

15. The data processing system of claim 14, wherein providing the portion of the system data to the user comprises performing a lookup process to obtain the portion of the system data.

16. The data processing system of claim 14, wherein the first operational aspect is one selected from a list consisting of:

a cost of the operation of the data processing system;
a recoverability of the data processing system;
a performance capability of the data processing system; and
a capacity of the data processing system.

17. The method of claim 9, wherein the impact data comprises, for each of the two operational aspects that are different than the first operational aspect, a change to a quantification of a status of the corresponding operational aspect based on the updated simulated operation, wherein the change is as a result of implementing the action set associated with the first operational aspect.

18. The method of claim 17, further comprising:

obtaining, via the preference selection tool, operation criteria for the data processing system, wherein the operation criteria comprise, for each of the two operational aspects that are different than the first operational aspect, a change limit that indicates an approved range for the quantification of the status of the corresponding operational aspect in the updated simulated operation.

19. The method of claim 18, wherein the first operational aspect is a recoverability of the data processing system, wherein the two operational aspects that are different than the first operational aspect comprise a cost of operation of the data processing system and a capacity of the data processing system, and wherein the impact data comprises changes to the cost of operation and the capacity as a result of implementing the action set associated with the recoverability of the data processing system.

20. The method of claim 19, wherein making the first determination further comprises comparing, for each of the cost of operation and the capacity, the impact data with the operation criteria.

* * * * *